United States Patent Office 2,827,478
Patented Mar. 18, 1958

2,827,478

CHLOROALIPHATIC MONOCARBOXYLIC ACID ESTERS OF DIHYDROXYBENZOPHENONES

Herman O. Senkbeil, Midland, Mich., assignor to The Dow Chemical Company, Midland, Mich., a corporation of Delaware No Drawing. Application December 31, 1956
Serial No. 631,439

4 Claims. (Cl. 260—479)

This invention relates to the fully esterified polychloro loweraliphatic monocarboxylic acid esters of dihydroxybenzophenones having the formula

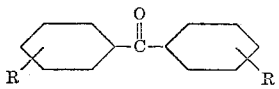

wherein each R occupies one of the independently selected 2 and 4 positions on the benzene rings and represents the same polychloroacyloxy radical of the lower aliphatic series. The expression "acyloxy radical of the lower aliphatic series" as employed in the present specification and claims refers to the acyloxy radicals having the formula

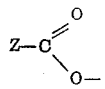

wherein Z represents an alkyl radical containing from 1 to 4 carbon atoms. These compounds are viscous liquids or crystalline solids somewhat soluble in many organic solvents and of low solubility in water. They have been found to be active as plant growth control materials and are adapted to be employed as active toxic constituents in dust and spray compositions for the control of weeds and for the sterilization of soil with regard to plant growth. The compounds are also useful as parasiticides for the control of many bacterial and fungal organisms.

The new compounds may be prepared by reacting a dihydroxybenzophenone having the formula

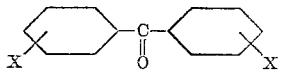

wherein each X represents a hydroxyl group which occupies one of the 2 and 4 positions on the benzene ring with the anhydride of a polychloro loweraliphatic monocarboxylic acid such as dichloroacetic acid, trichloroacetic acid, the dichloropropionic acids, the trichloropropionic acids, the dichlorobutyric acids, the trichlorobutyric acids, the dichlorovaleric acids and the trichlorovaleric acids. The reaction takes place smoothly at the temperature range of from 90° to 180° C. and conveniently at the boiling temperature of the mixture with the formation of the desired ester product and the polychloro loweraliphatic monocarboxylic acid of reaction. Good results are obtained when at least two molecular proportions of the polychloro loweraliphatic monocarboxylic acid anhydride are reacted with one molecular proportion of the dihydroxybenzophenone. The employment of an excess of the anhydride and the removal of the polychloro loweraliphatic monocarboxylic acid as formed generally results in optimum yields.

In carrying out the reaction, the reactants are mixed together and the resulting mixture heated with stirring at a temperature of from 90° to 180° C. for a period of time to complete the reaction. The heating may be carried out under reduced pressure and at a temperature at which the polychloro loweraliphatic monocarboxylic acid of reaction boils to effect the removal of by-product polychloro loweraliphatic monocarboxylic acid as formed. Upon completion of the reaction, the desired product is obtained as a liquid or solid residue. When the product is a solid, it may be separated by filtration and thereafter purified by recrystallization from various organic solvents.

The following examples illustrate the invention but are not to be construed as limiting:

*Example 1.—2,2'-bis(dichloroacetoxy)-benzophenone*

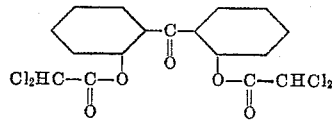

A mixture of 53.5 grams (0.25 mole) of 2,2'-dihydroxybenzophenone and 150 grams (0.62 mole) of dichloroacetic anhydride was heated with stirring at a temperature of from 106° to 152° C. at 10 millimeters pressure while continuously removing by distillation 74 grams of dichloroacetic acid formed during the reaction. There was obtained as a viscous liquid residue a 2,2'-bis(dichloroacetoxy)-benzophenone product having a saponification equivalent of 228 compared to the calculated equivalent of 218.

*Example 2.—4,4'-bis(dichloroacetoxy)-benzophenone*

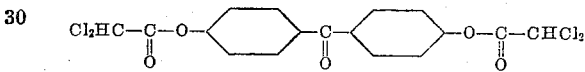

A mixture of 53.5 grams (0.25 mole) of 4,4'-dihydroxybenzophenone and 144 grams (0.60 mole) of dichloroacetic anhydride was heated with stirring at a temperature of from 93° to 145° C. at 10 millimeters pressure until 76 grams of dichloroacetic acid formed during the reaction was removed by distillation. The solid residue remaining in the reaction flask was recrystallized from ethanol to obtain a 4,4'-bis(dichloroacetoxy)-benzophenone product as a white solid melting at 163°–165° C. This product had a saponification equivalent of 223 compared to the calculated equivalent of 218 and a chlorine content of 31.8 percent compared to the theoretical value of 32.5 percent.

*Example 3.—4,4'-bis(α,α-dichloropropionoxy)-benzophenone*

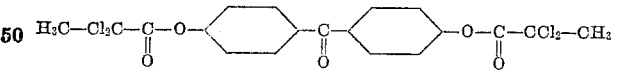

53.5 grams (0.25 mole) of 4,4'-dihydroxybenzophenone and 174.2 grams (0.65 mole) of α,α-dichloropropionic anhydride were mixed and the resulting mixture heated for 16 hours at a temperature of from 135° to 158° C. The α,α-dichloropropionic acid formed during the reaction was removed by distillation at a temperature of 108° C. at 10 millimeters pressure. The solid residue remaining was crystallized from cyclohexane to obtain a 4,4'-bis(α,α-dichloropropionoxy)-benzophenone product which melted at 172°–177° C. This product had a saponification equivalent of 242 and a chlorine content of 30.7 percent compared to the theoretical values of 232 and 30.6 percent.

*Example 4.—2,2'-bis(α,α-dichlorobutyroxy)-benzophenone*

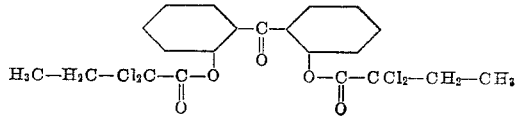

This diester compound is prepared in a manner similar to that described in Example 3 by heating a mixture of 0.25 mole of 2,2'-dihydroxybenzophenone and 0.6 mole of α,α-dichlorobutyric anhydride at the boiling temperature and under reflux while continuously removing the α,α-dichlorobutyric acid formed during the reaction. The desired compound is a solid having a molecular weight of 492.

In a similar manner other polychloro loweraliphatic monocarboxylic acid esters of dihydroxybenzophenones may be prepared as follows:

2,4'-bis(trichloroacetoxy)-benzophenone by the reaction of 2,4'-dihydroxybenzophenone and trichloroacetic anhydride.

2,2'-bis(α,α-dichloropropionoxy)-benzophenone by the reaction of 2,2'-dihydroxybenzophenone and α,α-dichloropropionic anhydride.

4,4'-bis(α,α,β-trichlorobutyroxy)-benzophenone by the reaction of 4,4'-dihydroxybenzophenone and α,α,β-trichlorobutyric anhydride.

4,4'-bis(α,α-dichlorovaleroxy)-benzophenone by the reaction of 4,4'-dihydroxybenzophenone and α,α-dichlorovaleric anhydride.

2,4'-bis(α,α-dichlorovaleroxy)-benzophenone by the reaction of 2,4'-dihydroxybenzophenone and α,α-dichlorovaleric anhydride.

The new compounds of the present invention are effective as herbicides for the killing of weeds and the sterilization of soil with regard to plant growth. They are also useful as antimicrobial agents and are adapted to be employed for the control of many bacterial and fungal organisms. For such use, the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of wetting, dispersing or emulsifying agents. In representative operations, good controls of the growth of the seeds and emerging seedlings of millet, wild oats and canary grass have been obtained with 4,4' - bis(α,α - dichloropropionoxy) - benzophenone when applied at the rate of 50 pounds per acre to soil previously planted with said plant species.

The preferred embodiments of the present invention are the dihydroxybenzophenone esters of dichloroacetic acid, trichloroacetic acid, α,α-dichloropropionic acid, α,α,β-trichloropropionic acid, α,α-dichlorobutyric acid, α,α,β-trichlorobutyric acid, α,α-dichlorovaleric acid and α,α,β-trichlorovaleric acid.

I claim:

1. A polychloro loweraliphatic monocarboxylic acid ester of a dihydroxybenzophenone having the formula

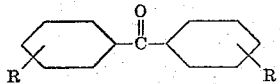

wherein each R occupies one of the independently selected 2 and 4 positions on the benzene rings and represents the same polychloroacyloxy radical of the lower aliphatic series.

2. 4,4'-bis(α,α-dichloropropionoxy)-benzophenone.
3. 2,2'-bis(dichloroacetoxy)-benzophenone.
4. 4,4'-bis(dichloroacetoxy)-benzophenone.

References Cited in the file of this patent
UNITED STATES PATENTS
2,309,335    Bruson _____ Jan. 26, 1943